3,174,921
POLYMERIZATION OF ISOBUTYLENE
Max S. Matheson, Hinsdale, Ill., assignor to the United States of America as represented by the United States Atomic Energy Commission
Filed June 14, 1962, Ser. No. 202,637
1 Claim. (Cl. 204—162)

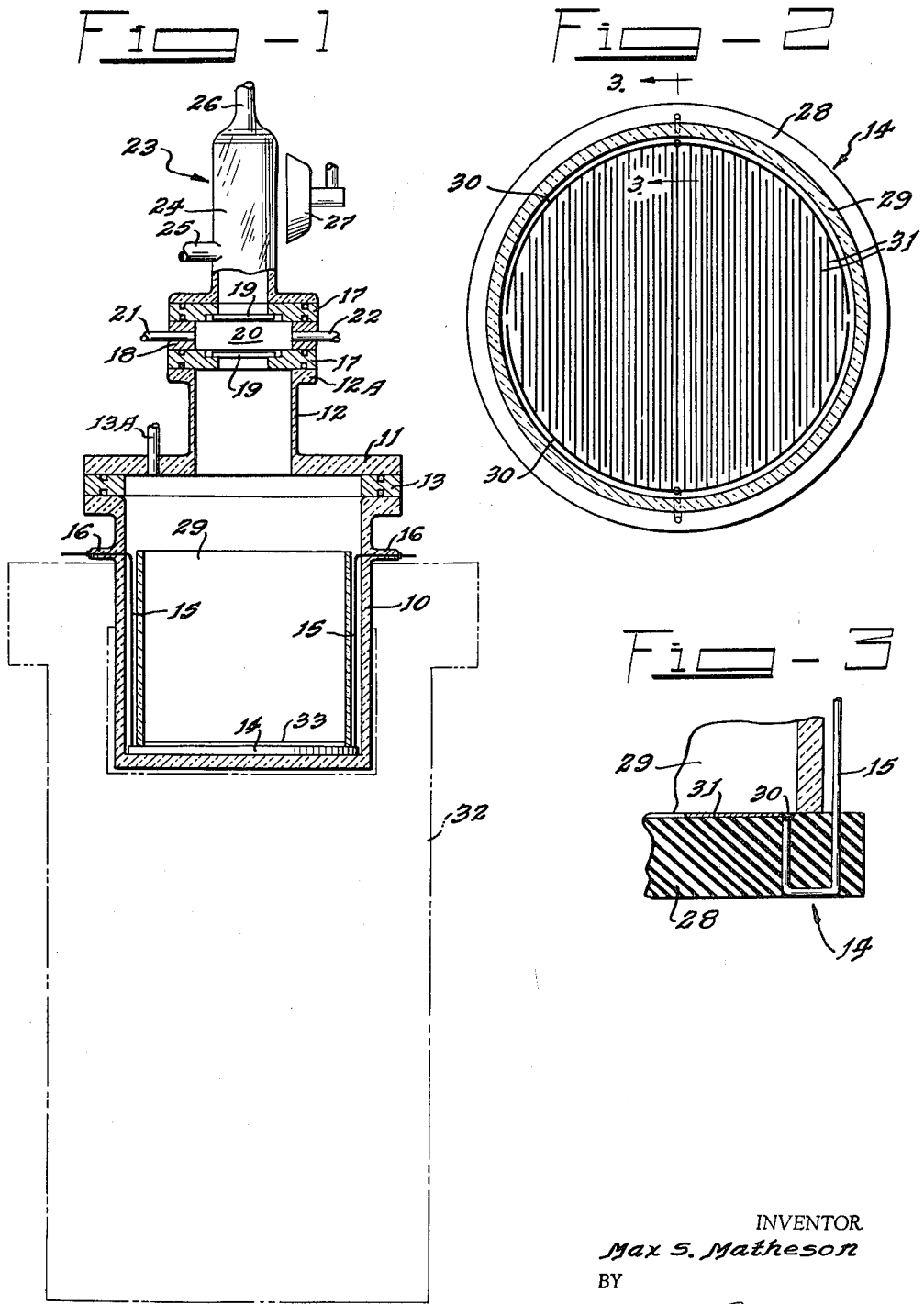

This invention relates to a method and apparatus for polymerizing isobutylene to produce polyisobutylene.

Isobutylene is a gas at room temperature having the formula $CH_2=C(CH_3)_2$. Isobutylene can be polymerized to a compound of large molecular weight consisting of many repetitions of the unit

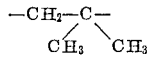

which is known as polyisobutylene. Polyisobutylene finds utility as an extended in artificial rubber.

It is accordingly an object of the present invention to develop a novel method and apparatus for polymerizing isobutylene.

Reference is now made to the accompanying drawings wherein:

FIG. 1 is a vertical sectional view of the apparatus for polymerizing isobutylene.

FIG. 2 is a horizontal plan view of a grid forming a part of the apparatus for polymerizing polyisobutylene, and FIG. 3 is a partial vertical sectional view taken in the direction of the arrows 3—3 in FIG. 2.

In general the invention comprises irradiating isobutylene in a vacuum at a low temperature with ultraviolet light of a low wave length. The invention is best carried out by irradiating a mixture of isobutylene and isopentane or ethyl chloride at a temperature of $-150°$ C. to $-160°$ C. The wave length of the ultraviolet light employed is in the range of what is known as the vacuum ultraviolet; that is, light having a wave length of lower than 1600 A.

Referring now to the drawing, the apparatus includes a "Pyrex" reaction vessel 10 provided with a "Pyrex" cover 11 including a chimney 12 formed with a flange 12A at the top thereof. A seal 13 is provided between vessel 10 and cover 11 and an inlet 13A is provided in cover 11. An electrically charged grid 14 provided with leads 15 extending through the walls of reaction vessel 10 at 16 is disposed in the bottom of vessel 10 and cooling means 32 surrounding vessel 10 is indicated diagrammatically.

A pair of aluminum window mounts 17 separated by a brass ring 18 are disposed on top of flange 12A. A pair of windows 19, which may be formed of lithium fluoride or fused silica, are sealed into window mounts 17. A chamber 20 is thus disposed between windows 19. Inlet and outlet lines 21 and 22, respectively, for introducing gases into chamber 20 communicate with chamber 20 through brass ring 18. Chamber 20, when filled with a gas introduced through line 21, serves as a filter chamber to filter the light passing therethrough. By this means only selected wave lengths are permitted to enter vessel 10.

A lamp 23 generating ultraviolet light rests on the top of the upper window mount 17. Lamp 23 consists of a lamp body 24, an inlet line 25 for gas, an outlet line 26 for gas, and a microwave radiator 27. Microwaves of 2450 mc. from radiator 27 excite different gases contained in lamp body 24 at low pressure to obtain ultraviolet light of different wave lengths. The light from the lamp is directed through chamber 20 into vessel 10.

Grid 14 is shown in more detail in FIGS. 2 and 3. Grid 14 consists of a round disc 28 of quartz five mm. thick and 87 mm. in diameter. A "Pyrex" cylinder 29 is disposed in vessel 10 near but not touching the walls thereof for the purpose of shielding lead wires 15. Lead wires 15 pass behind cylinder 29 to the bottom of disc 28 and then pass up through a hole in disc 28 to an electrical connection with two separate semicylindrical conducting strips 30 of gold deposited on the surface of the disc 28 near the periphery thereof. Extending inwardly from each of semicylindrical strips 30 are a plurality of parallel conducting strips 31 of gold with adjacent strips 31 being connected to opposite semicylindrical strips 30. Strips 30 and 31 are 0.2 mm. in width and are spaced apart a distance of 0.2 mm. A different voltage can be impressed on adjacent strips 31 through leads 15 to obtain a charge density on the grid 14 of between 0 and 50,000 volts/cm.

The following experiment demonstrates that polymerization of isobutylene occurs when isobutylene is irradiated with ultraviolet light of the proper wave length.

Pure isobutylene and isopentane were dried separately over calcium hydride in a vacuum line. After the reaction vessel was evacuated, 7.5 cc. of each were distilled separately into the reaction vessel to a level 33 just above the top of grid 14. Irradiation was carried out for three hours at a temperature of $-150°$ C. to $-160°$ C. with ultraviolet light at 1470 A. and with light of wave length greater than 1600 A. The 1470 A. light was produced by the excitation of xenon at about 1 mm. pressure with 2450 mc. microwaves while using lithium fluoride windows. Methane was employed to filter out lower wave lengths. The greater than 1600 A. light was produced by the excitation of hydrogen using fused silica windows to cut off lower wave lengths of hydrogen. During irradiation any gas generated was pumped off frequently.

Results

| Wave length, A.: | Weight of polymer, gm. |
|---|---|
| 1470 | 0.013 |
| >1600 | 0.003 |

These results show that polymer is produced at 1470 A. but that wave lengths longer than 1600 A. are relatively ineffective in causing polymerization. Other experiments showed that a wave length of 1236 A. is effective and that a wave length of 1849 A. is not effective. Light of wave length shorter than 1236 A. has not been used but would be expected to be effective. The exact nature of the lamp is not important except that it should give appreciable light having a wave length below 1600 A.

It will be noted that the above-described experiments were carried out on a two-component mixture. This is an important feature of the present invention because isobutylene alone cannot be polymerized in the apparatus described with ultraviolet light.

Since the freezing point of isobutylene is $-138°$ C., the temperature of operation, if isobutylene alone is to be irradiated, must be above this temperature. At temperatures above $-138°$ C. the vapor pressure of isobutylene is sufficiently high that the light from the lamp is absorbed by the vapor in the reaction vessel and cannot cause a reaction in the liquid isobutylene because it does not impinge thereon.

By employing a two-component mixture incorporating isopentane for example as the second component, the freezing point is reduced to less than $-160°$ C. The reaction can then be carried out at $-150°$ C. to $-160°$ C. at which temperatures the vapor presure of the mixture is sufficiently low that the light from the lamp can pass through the vapor in the reaction vessel to impinge on the liquid.

The grid was employed in some experiments to show that the shorter wave lengths which were most effective in producing polymerization also produced the greatest currents through the liquid when a voltage was applied to the grid. The charge density on the grid can be, for example, about 5000 volts/cm. It is believed that this current was produced by ionization of the isobutylene. This corroborates the belief currently held that polymerization of isobutylene is an ionic phenomenon.

It will be appreciated that the results of the experiments described above were not the optimum which could be obtained. The experiments were designed to determine what wave lengths were effective in producing polymerization rather than to determine the optimum conditions for producing polymer.

It will be understood that the invention is not to be limited to the details given herein but that it may be modified within the scope of the appended claim.

What is claimed is:

A method of polymerizing isobutylene comprising irradiating a mixture of equal parts of isobutylene and isopentane in a vacuum with ultraviolet light having a wave length lower than 1600 A. at a temperature between $-150°$ C. and $-160°$ C.

References Cited by the Examiner
UNITED STATES PATENTS

| | | | |
|---|---|---|---|
| 2,448,828 | 9/48 | Renfrew | 204—162 |
| 2,674,697 | 4/54 | Nicholson | 250—49 |
| 2,924,561 | 2/60 | Schmerling | 204—162 |
| 2,935,611 | 5/60 | Myers | 250—49 |

MURRAY TILLMAN, *Primary Examiner.*

J. R. SPECK, *Examiner.*